Dec. 30, 1930.  A. W. KEGLER  1,786,431

SPRAYER

Original Filed Feb. 20, 1924

INVENTOR
ANTON W. KEGLER
By Paul, Paul & Moore
ATTORNEYS

Patented Dec. 30, 1930

1,786,431

UNITED STATES PATENT OFFICE

ANTON W. KEGLER, OF MINNEAPOLIS, MINNESOTA, ASSIGNOR TO HUDSON MANUFAC-
TURING CO., OF MINNEAPOLIS, MINNESOTA, A CORPORATION OF MINNESOTA

SPRAYER

Original application filed February 20, 1924, Serial No. 694,019. Renewed April 28, 1928. Divided and
this application filed September 17, 1928. Serial No. 306,319.

This invention relates generally to spraying devices particularly intended to meet the requirements of the small orchardist, gardener and fruit grower. Features of the invention are the mounting of the supply tank so that it can be moved about, in wheelbarrow manner; the swinging arrangement of the tank whereby it is self-leveling and whereby it forms a foot for the wheeled frame upon which it is mounted; the mounting of a pump within the tank and flexible connection between the pump and the spraying tank also carried by the frame which mounts the supply tank; and the details of construction of the mounting and manner of assembly which permits of the swinging motion of the tank.

This application is divisional of my co-pending application Ser. No. 694,019, filed April 28, 1928, for sprayers.

Objects, advantages and features of the invention will appear in the description of the drawings forming a part of this application, and in said drawings, Fig. 1 is a side elevation illustrating the complete device;

Located upon the handle bars between the tank and wheel, adjacent the wheel, and upon downwardly slanting portions 10ª of bars 10, is a closed pressure tank 17. This downwardly slanting arrangement of the bars, permits lowering of the center of gravity of the tank 17 to stabilized equilibrium of the vehicle, and is a feature of the invention.

Figure 1:
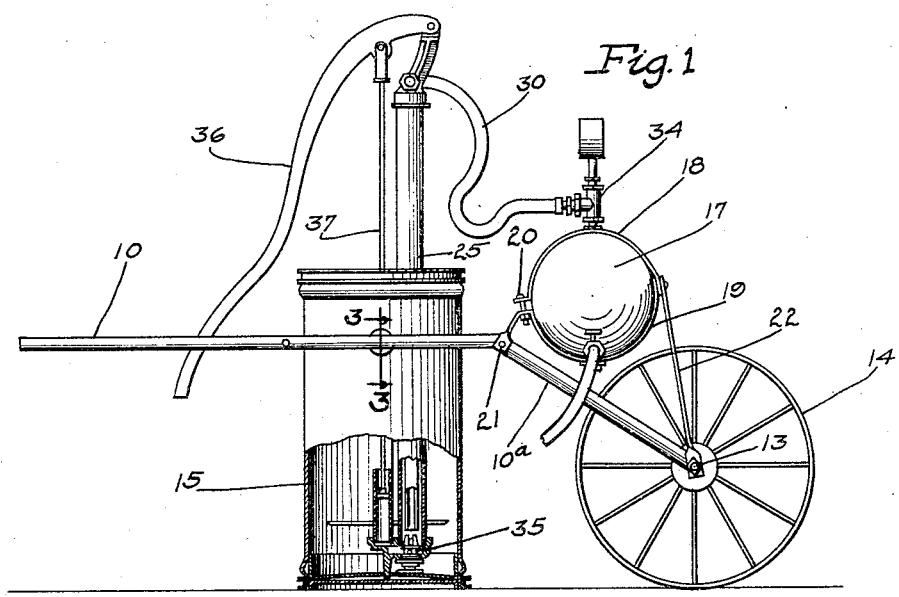
Figure 2:
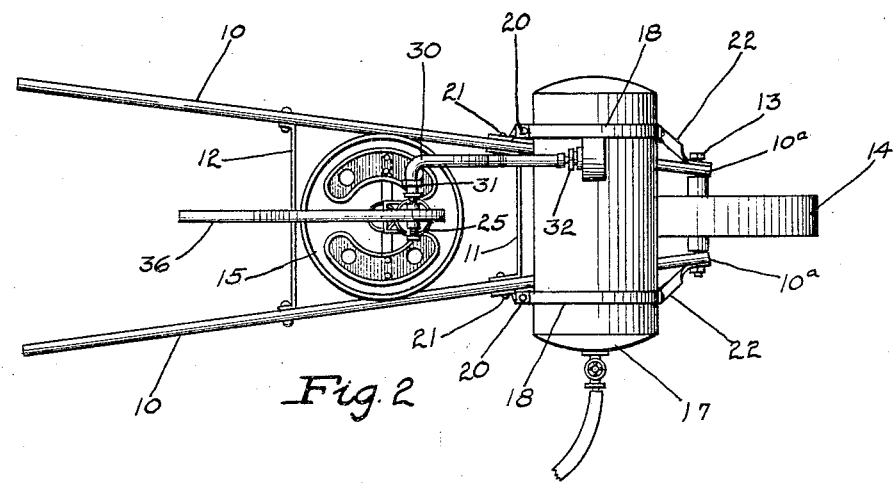
Fig. 2 is a plan view.
Figure 3:
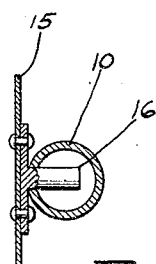
Fig. 3 is a detail section on the line 3—3 of Fig. 1.

The means for securing the tank includes saddle straps of which there are two, each comprising sections 18 and 19. Each section has an extension as a foot, which is riveted or otherwise secured to the corresponding bar 10 as shown at 21. Bolts 20 and nuts therefor clampingly secure the sections, it being understood that the sections are connected together at another point. However, the straps may be formed from a single length of material. Brace strips 22 connect the clamping elements or straps with the journal bolt 13, the strips being disposed one on each side of the wheel 14 as best shown in Figure 2. The frame of the wheelbarrow structure comprises a pair of forwardly converging handle bars 10 (preferably metal tubes), spaced apart but rigidly connected by transverse metal tie-straps 11 and 12, and provided at their front ends with a transverse axial bolt 13 on which the wheel 14 is journaled. This bolt connects the handle bars, so that they can be moved toward and away from one another.

The spraying liquid, in considerable quantity, 15 to 20 gallons, is carried in an open tank 15. This tank is of cylindrical configuration and is arranged in upright position and has an open top. The tank is provided at its vertical sides with diametrically aligned outstanding trunnions 16 which fit perforations on the inner sides of the handle bars 10. These trunnions are located far above the center of gravity of the tank 15 so that the tank will swing with a pendulum-like action to always assume a vertical or upright position. When the handle bars are lowered the bottom of the tank will rest upon the ground, and when these bars are lifted preparatory to the act of wheeling, the tank will always assume an upright position. A self-leveling tank is therefore provided. The tank is mounted at a point between the straps 11 and 12. These straps act to brace the frame to prevent separation of the trunnions from the openings in the bars 10. It will be noted that in assembling, the bars 10 are first attached by the bolt 13 and are then spread sufficiently to allow introduction of the trunnions, after which they are brought together, the trunnions entering the openings of the bars during this movement. The bars are then secured in operative relation by the straps 11 and 12. This is a feature of the invention.

Located within the supply tank 15 is a self-contained structure which includes a pump, a pressure equalizing chamber, an agitator and certain other devices, which are not claimed herein, and are therefore not more fully illustrated. The pump includes an equalizing tube 25 which tube is connected in upright position to the tank by any suitable means.

Another feature of this invention is the flexible tubular connection between the extension and the tank 17 which establishes communication between the pump and tank so that a pressure can be maintained in the tank, and which allows swinging motions of the tank 15. The connection is indicated by the numeral 30 and may consist of a section of rubber hose or equivalent element detachably connected as at 31 at one end to communicate with the pressure portion of the pump 25, and likewise detachably secured as at 32 with a tube 34 which communicates with the interior of the pressure tank 17. It has been considered unnecessary to show what relation the element 34 has to the interior of the tank, inasmuch as the present invention relates only to the arrangement of the tank 15, pump 25, tank 17, and the flexible tubular connection 30, along with the detail of construction of frame, and the manner of mounting and assembling the tank to provide for its swinging motion and self-leveling adjustment. When the pump handle 36 is operated in one direction, the rod 37 is operated to cause liquid to be drawn from the tank 15 through a suitable check valve 35, and upon handle movement in the opposite direction, the liquid is forced through the flexible connection 30 into the tank 17. The wall of the tank 15 has been broken away to show the general relation of the bottom part of the pump structure to the bottom of the tank 15.

I claim as my invention:

1. In a device of the class described, a frame, a supply tank arranged upon the frame and swingingly connected thereto, a pressure tank arranged upon the frame, a pump carried by the supply tank, and a delivery tube establishing communication between the pump and pressure tank, and of a length to permit oscillatory movement of the supply tank relative to the pressure tank.

2. A device of the class described comprising a pair of handle bars, a wheel, a journal for the wheel connecting the bars, each bar being bent to provide a portion slanting upwardly from the point of connection with the wheel and merging into a portion at a higher level, a vertical supply tank swingingly connected between the last mentioned portions of the bars, and acting as a foot for the wheeled frame, and a tank connected to the slanting portions of the bars adjacent the wheel, whereby the equilibrium of the single wheeled frame is stabilized by lowering the center of gravity of the last mentioned tank, while at the same time the supply tank can have a maximum vertical height and properly act as a foot to prevent overturning of the vehicle.

3. A pair of handle bars, a wheel, a journal for the wheel connecting the bars, a tank connected to the bars adjacent the wheel, a pair of straps surrounding and secured to the tank and each having an extension as a foot secured to a respective bar, and supporting element secured to each strap at that side opposite the foot, said elements lying at opposite sides of the wheel, and being respectively attached to the wheel journal and bar-connecting element.

4. In a spraying device, the combination with handle bars and a wheel journaled to the front ends thereof, of a gravity arighted supply tank pivotally hung on said handle bars, a pressure tank carried by said handle bars, a pump for the supply tank, and means for delivering fluid from the pump to said pressure tank, including a flexible tube permitting oscillatory movement of said supply tank in respect to said pressure tank.

5. In combination with a frame having wheels, a supply tank swingingly hung within the frame to remain in upright position and adapted to act as a foot to support the frame at one side of the wheel, a pressure tank mounted upon the frame, a pumping apparatus arranged within and connected for movement with the supply tank, and a flexible tube establishing communication between the pump and pressure tank and of a length to permit oscillatory movements of the supply tank relative to the pressure tank.

6. In combination with a frame having a wheel, a supply tank swingingly hung within the frame to remain in upright position and adapted to act as a foot to support the frame at one side of the wheel, a pressure tank mounted upon the frame between the tank and wheel, a pumping apparatus arranged and connected for movement within the supply tank, and a flexible tube establishing communication between the pump and pressure tank and of a length to permit oscillatory movements of the supply tank relative to the pressure tank.

7. In a portable spraying apparatus the combination with a single wheel frame, a tank swingingly mounted to act as a foot for the frame, a second tank mounted upon the frame, means for delivering liquid from one tank to the other including a flexible delivery tube.

8. A device of the class described comprising a frame and a wheel attached to the frame, said frame being provided with a portion slanting upwardly from the point of connection of the wheel therewith and merging into a handle portion at a higher level, a supply tank attached to the frame and adapted to act as a foot for the wheeled frame, and a tank connected to the slanting portion of the frame adjacent the wheel, whereby the equilibrium of a single wheeled frame is stabilized by lowering the center of gravity of the last mentioned tank while at the same time the supply tank can have a maximum vertical height and properly act as a foot to prevent overturning of the vehicle.

In witness whereof, I have hereunto set my hand this 13th day of September, 1928.

ANTON W. KEGLER.